Figure 1:
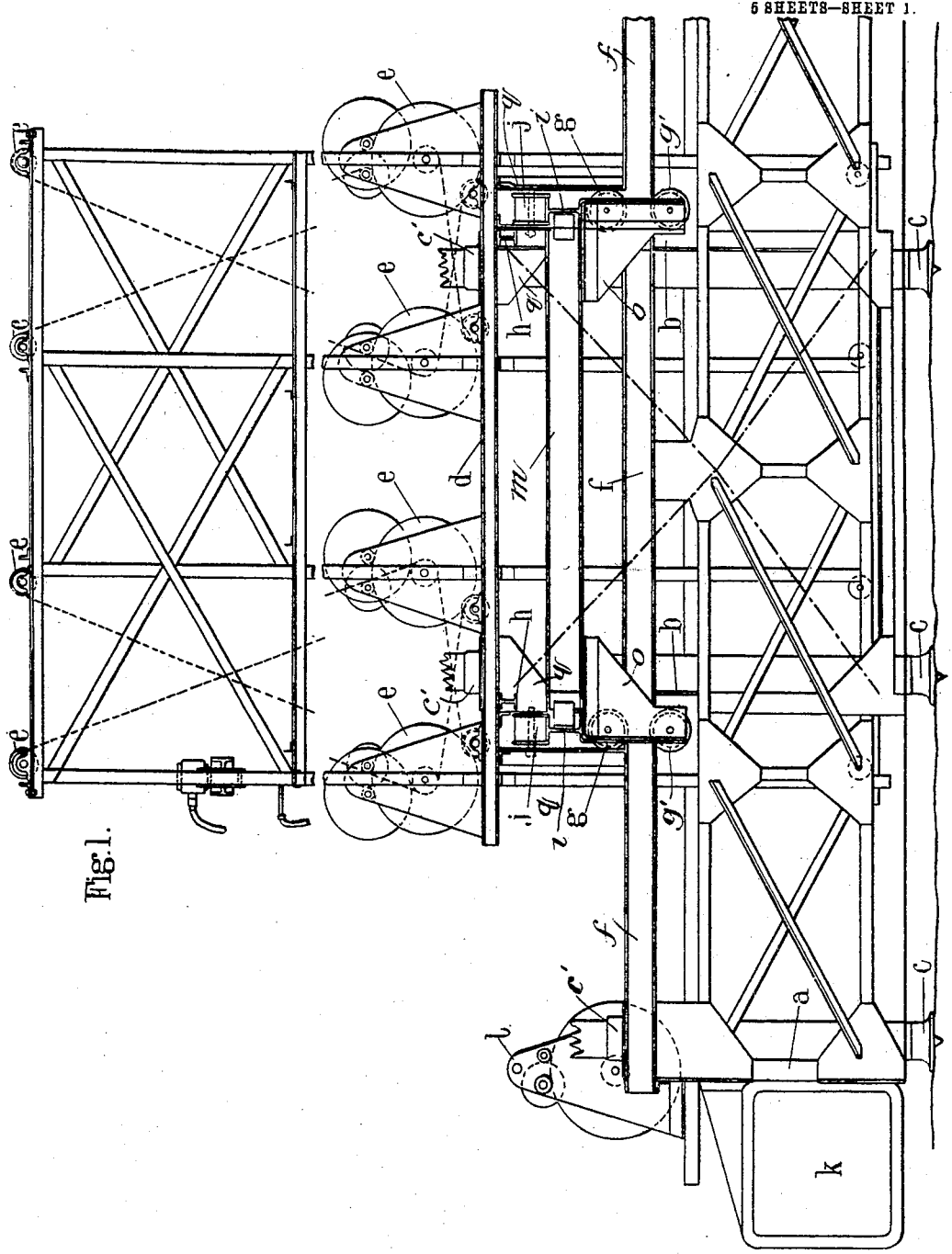

R. A. A. S. PIERCY.
STAGING OR SUPPORT FOR SUBMARINE BORING, BLASTING, PILE DRIVING, BLOCK SETTING, AND LIKE OPERATIONS.
APPLICATION FILED FEB. 15, 1909.

968,975.

Patented Aug. 30, 1910.

5 SHEETS—SHEET 1.

Witnesses

Inventor
Robert Alwyn Arnold Stephen Piercy

R. A. A. S. PIERCY.
STAGING OR SUPPORT FOR SUBMARINE BORING, BLASTING, PILE DRIVING, BLOCK SETTING, AND LIKE OPERATIONS.
APPLICATION FILED FEB. 15, 1909.

968,975.

Patented Aug. 30, 1910.
5 SHEETS—SHEET 4.

WITNESSES.
Howard N. Orr.
George Tate

INVENTOR,
Robert A.A.S. Piercy,
BY E.G. Siggers
ATTY.

R. A. A. S. PIERCY.
STAGING OR SUPPORT FOR SUBMARINE BORING, BLASTING, PILE DRIVING, BLOCK SETTING, AND LIKE OPERATIONS.
APPLICATION FILED FEB. 15, 1909.
968,975.
Patented Aug. 30, 1910.
5 SHEETS—SHEET 5.
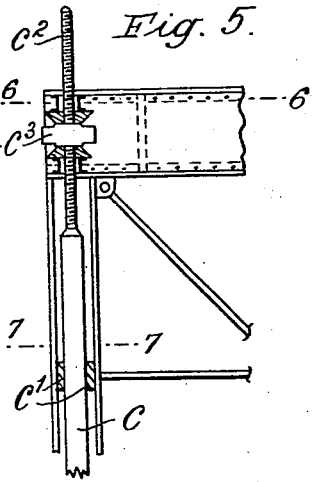
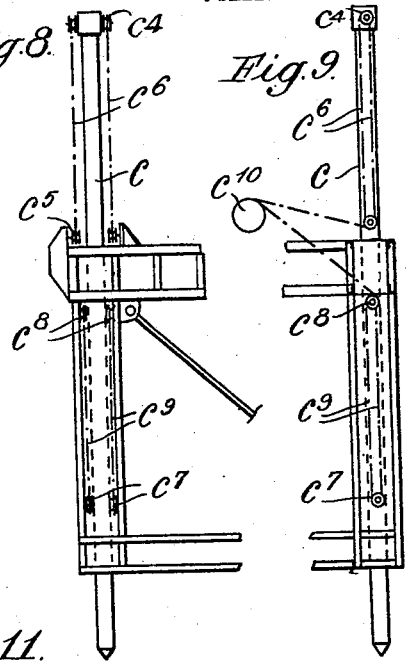
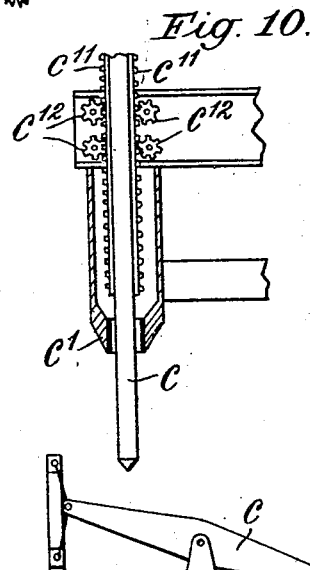
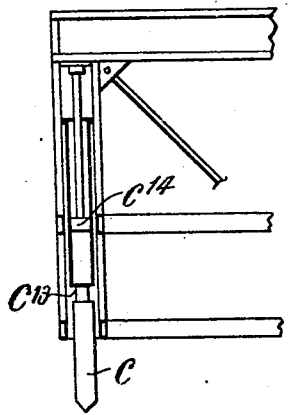
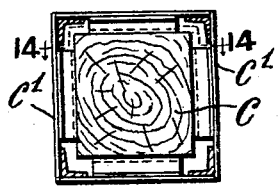
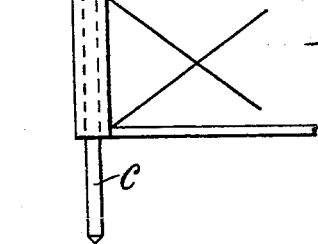
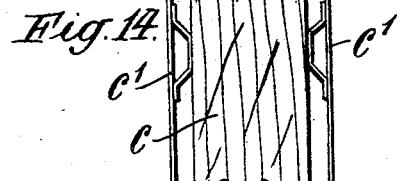
WITNESSES.
Howard D. Ort.
George Tate.
INVENTOR,
Robert A. A. S. Piercy,
BY E. G. Siggers
ATTY.

UNITED STATES PATENT OFFICE.

ROBERT ALWYN ARNOLD STEPHEN PIERCY, OF SCRUBWOOD, WENDOVER, ENGLAND.

STAGING OR SUPPORT FOR SUBMARINE BORING, BLASTING, PILE-DRIVING, BLOCK-SETTING, AND LIKE OPERATIONS.

968,975.

Specification of Letters Patent.  Patented Aug. 30, 1910.

Application filed February 15, 1909. Serial No. 478,066.

*To all whom it may concern:*

Be it known that I, ROBERT ALWYN ARNOLD STEPHEN PIERCY, a subject of His Majesty the King of England, residing at Scrubwood, Wendover, England, civil engineer, have invented certain new and useful Improvements in and Relating to Stagings or Supports for Submarine Boring, Blasting, Pile - Driving, Block - Setting, and Like Operations, of which the following is a specification.

This invention relates to an improvement in stagings or supports, which is especially adapted for employment in connection with submarine boring, blasting, pile-driving, block-setting, and like operations.

The principal object of the invention is to provide a movable staging or support of the class described, which will not be subjected to the effects of tidal currents, waves from passing vesesls, or other interfering influences.

Another object of the invention is to provide a support or staging for the purpose described, which does not, in use, necessitate the employment of a barge or other floating structure, as in the present practice.

A still further object of the invention is to provide a staging or support of the class described which broadly comprises two structures or members which normally rest upon the sea or other bottom, one of the members being adapted to carry the tools or other working apparatus, and being so combined with the other member as to be capable of being moved thereover, for longitudinal or transverse movement, or both, and in some cases radially, while both structures are also adapted to be moved separately and bodily with respect to each other, to meet different working positions.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

Figure 2:
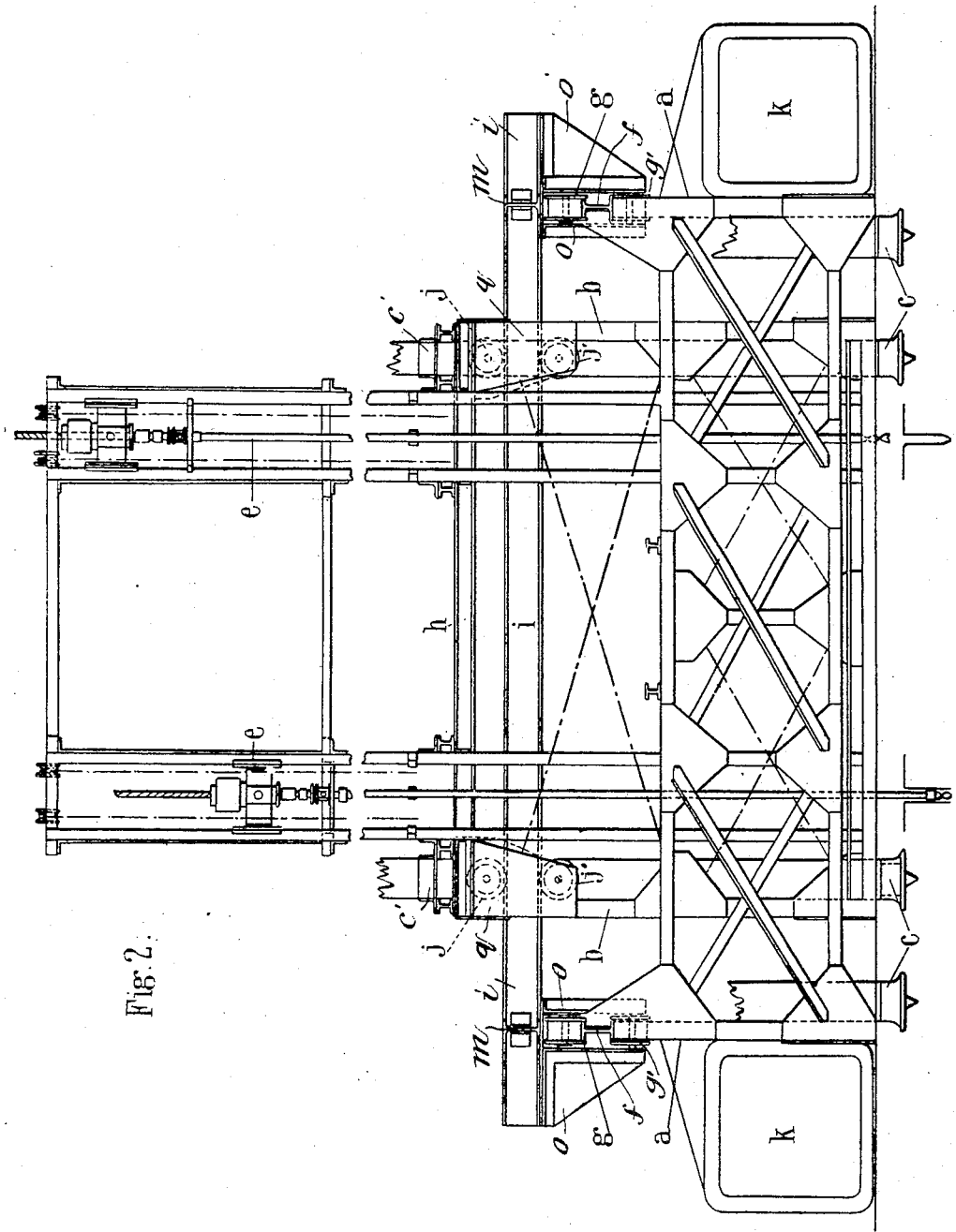
Figure 3:
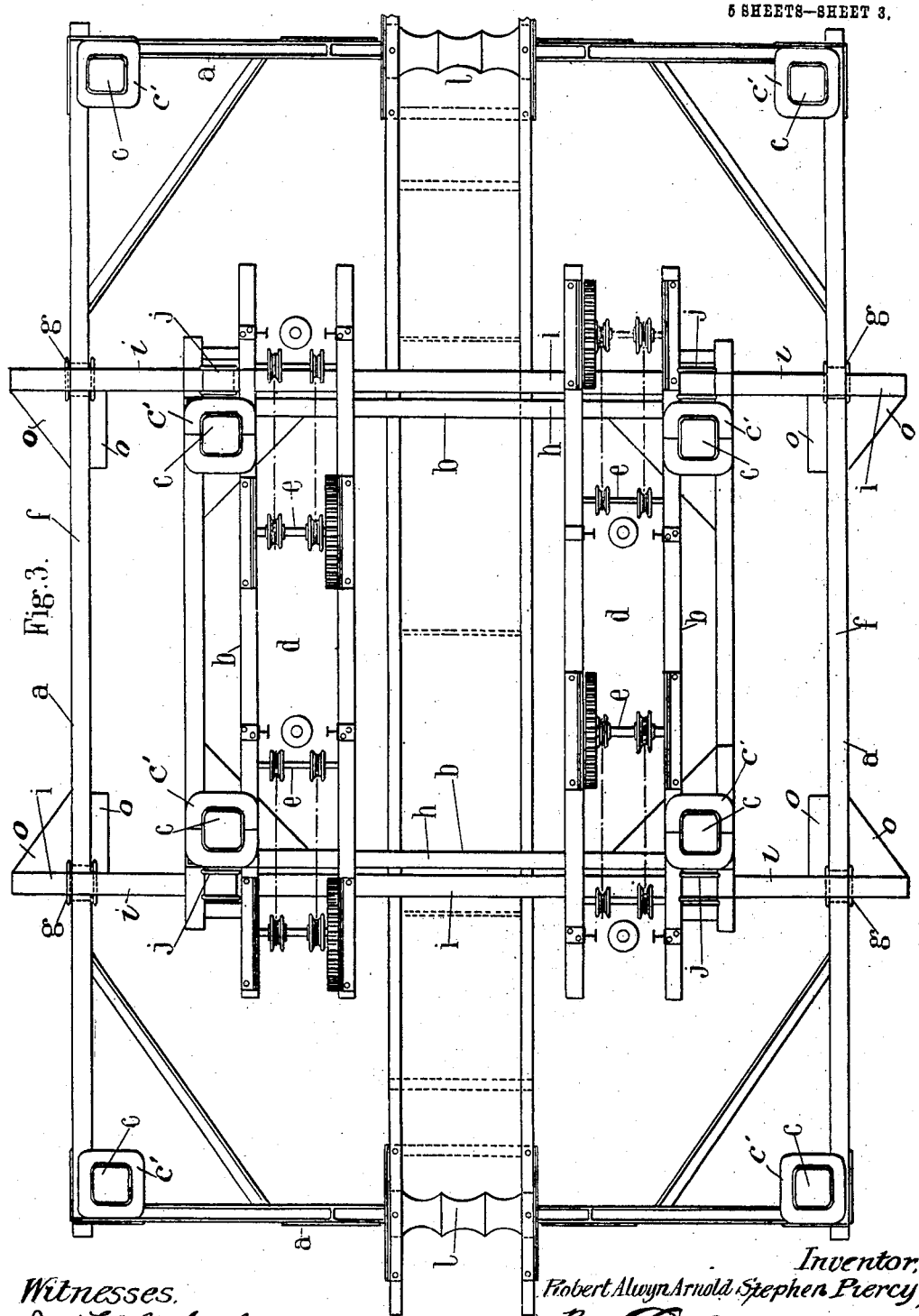
Figure 4:
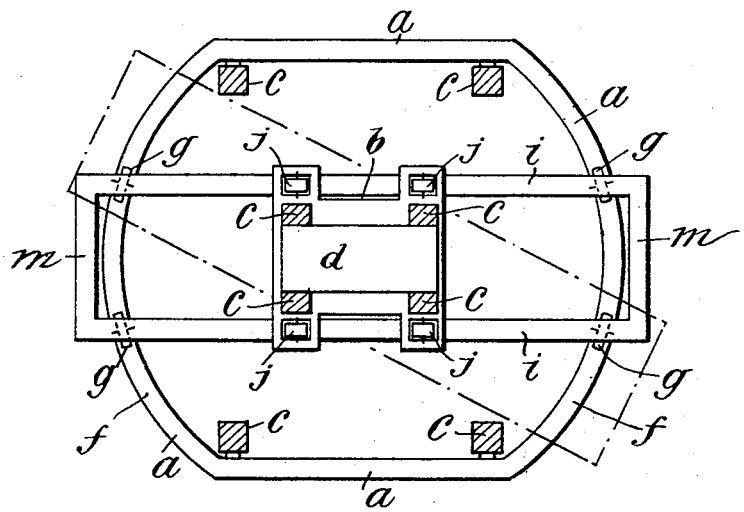

In the drawings:—Figure 1 is a side elevation of the structure. Fig. 2 is an end view thereof. Fig. 3 is a top plan view of the same. Fig. 4 is a top plan view of a modification, showing the members being capable of radial movement. Fig. 5 is a detail sectional view showing a combined means of mounting and operating the vertically movable spuds. Fig. 6 is a horizontal sectional view taken on the line 6—6 of Fig. 5. Fig. 7 is a horizontal sectional view taken on the line 7—7 of Fig. 5. Fig. 8 is a detail front elevation of another means for operating the spuds. Fig. 9 is a side elevation of the same. Fig. 10 is a detail sectional view showing a still further means for operating the spuds. Fig. 11 is a detail sectional view showing a still further means for operating the spuds. Fig. 12 is a detail side elevation of another means for operating the spuds. Fig. 13 is a detail horizontal sectional view of a spud and guide therefor, and Fig. 14 is a detail vertical sectional view through the same, taken on the line 14—14 of Fig. 13.

Like reference letters designate corresponding parts in all the figures of the drawings.

Referring to the drawings, the invention comprises an outer structure which is designated as a whole by the letter $a$, which is preferably rectangular in shape, and includes spaced longitudinal I-beams $f$—$f$ which constitute track members. This outer structure is supported above the water by vertical spuds $c$ which are preferably arranged in each corner of the structure, and which rest upon the sea or other bottom. The spuds are respectively arranged within suitable guide-ways $c^1$ and are thereby prevented from lateral movement, although they can be moved vertically with respect to the structure, for a certain purpose, and by any of the operating means hereinafter described.

Arranged transversely of the outer structure, is a movable bridge comprising spaced supporting members or tracks $i$—$i$ of I-beam construction, which are connected together by means of cross-beams $m$—$m$. The said track members $i$—$i$ preferably extend beyond the tracks $f$—$f$ of the outer structure. Secured to the respective end portions of the said members $i$—$i$ by any suitable means, and depending therefrom are spaced brackets $o$—$o$ which straddle the said beams $f$—$f$ of the outer structure. Secured to each pair of brackets and arranged between the same, are spaced upper and lower rollers $g$—$g^1$, which are respectively arranged to engage the upper and lower track portions of the said I-beams $f$—$f$.

Arranged transversely of the movable frame, and adapted to move longitudinally thereover, is an inner structure which is designated as a whole by the reference letter $b$. This structure is preferably rectangular in shape, and includes spaced longitudinal members $h$—$h$ which are respectively connected at their ends by work-supporting platforms $d$—$d$. This structure is preferably spaced above the movable member, and the ends of the said platforms preferably extend beyond the track members $i$—$i$ of the bridge. Depending from the respective ends of the platforms, are spaced brackets $q$—$q$, which straddle the said track members $i$—$i$. Secured to each pair of brackets, and arranged between the same, are spaced upper and lower rollers $j$ and $j^1$ which are arranged to respectively engage the upper and lower track portions of the said track members $i$—$i$. Associated with the inner structure, and preferably arranged in each corner thereof, is a plurality of vertically movable spuds $c$—$c$. These spuds are also respectively arranged in suitable guide-ways $c^1$, and are thereby prevented from lateral movement, although they can be moved vertically with respect to the said structure. Arranged on the said platforms $d$, is a working apparatus $e$ of any suitable construction. One form of operating means for raising and lowering the said spuds of the inner and outer structures, is shown in Figs. 5, 6 and 7 of the drawings. In these figures, it will be observed that the spud $c$ is provided with a threaded extension $c^2$, and a nut $c^3$. The nut $c^3$ on the screw, serves to transmit the weight of the staging on the spud, or lifts the spud, as may be required.

In Figs. 8 and 9, pulley blocks $c^4$ are secured to the top of the spuds $c$, and other pulley blocks $c^5$ are secured on the staging close to the spuds. By means of wire or ropes $c^6$, the weight of the staging is lifted and lowered while supported by the spud. A similar set of pulley blocks $c^7$—$c^8$ and ropes $c^9$, of lighter construction, are adapted to lift and lower the spud, while it is supported by the staging. The wire or ropes $c^6$ and $c^9$ should be so wound by means of the winch-drums $c^{10}$, that while the rope from one set of the blocks is being wound, the other would be paid out.

In Fig. 10, a pair of racks $c^{11}$, carried by the spud $c$, is operated upon by pinions $c^{12}$, carried by the staging. These pinions may be operated by either hand or machinery (not shown), as desired.

A hydraulic mechanism for moving the spuds $c$, is shown in Fig. 11 of the drawings. In this arrangement, the upper end $c^{13}$ of the spud is attached to a hollow cylinder, which is adapted to be raised and lowered with its spud about the fixed piston $c^{14}$, which is secured to the main framework, according as the water is admitted above or below the piston.

Fig. 12 shows a suitable lever $c^{15}$, which is fulcrumed on the staging, for relatively raising or lowering the spud $c$ or the staging. The lever is connected at one end with the spud, and at the other end to any suitable operating mechanism, (not shown).

The staging or support may be assembled either at the working place, or previous to the same being taken there. In the latter event, the vertical movable spuds $c$ of both the inner and outer structures are elevated, and the entire structure floated into position between a pair of barges; or as shown, the outer structure may be provided with pontoons $k$—$k$ for the above purpose. When in position, the spuds $c$ are lowered to firmly rest upon the sea bottom, and if necessary, the outer structure may be moored by the means indicated at $l$.

During the progress of the work, it may be desirable to shift the working platform. This is accomplished by first raising the spuds $c$ of the inner structure, by any of the operating means before described. As soon as these spuds are disengaged from the bottom of the sea, the said structure can be moved longitudinally of the bridge, and consequently transversely of the outer structure. It also may be desirable to move the work platform longitudinally of the outer structure. It is then only necessary to move the bridge which carries the work support. Thus, it will be seen that the inner structure is capable of transverse and longitudinal movement on the outer structure.

In the event of the necessity of moving the staging or support in its entirety to meet a different working position, the spuds $c$ of the inner structure, are first lowered to firmly engage the bottom of the sea. The spuds $c$ of the outer structure are then raised from the bottom of the sea, thereby placing the weight of the entire staging upon the spuds $c$ of the inner structure. In this connection, it will be noted that the lower rollers $j^1$ of the inner structure, supports the bridge, and the rollers $g^1$ of the bridge, support the outer structure. Then, by any suitable means, (not shown,) the outer structure can be shifted across the movable frame in either direction. The spuds $c$ of the outer structure, are then lowered, and the spuds $c$ of the inner structure elevated, thereby permitting the inner structure and the bridge to be shifted longitudinally of the outer structure. These operations can be repeated as often as desired, and will permit of the structure to be shifted to various positions coincident with the work being done.

When the outer structure is being supported by the inner structure through the medium of the bridge, the weight of the said outer structure may tend to over-balance, and in order to prevent this occurrence, any suitable weight, (not shown) can be associated therewith, as will be readily understood.

In particular circumstances, it is found desirable to move either the inner or the outer structure radially with respect to each other, and this may be easily accomplished by simply curving or bending the longitudinal members $f-f$ of the outer structure, and mounting the pairs of bridge rollers on the inner structure at a corresponding angle so that they will run freely thereon, as illustrated in Fig. 4 of the drawing. Various combinations of this character, which can be formed, are included in my co-pending application, 530,173, filed Nov. 27, 1909.

I consider that I am first to devise a staging or support for submarine boring, blasting, pile-driving, block-setting and like operations, comprising two structures which normally rest firmly upon the sea or other bottom, one carrying the tools or working apparatus and so combined with and related to the other as to be capable of being moved relatively to it, while both structures are also adapted to be moved separately and bodily to meet different working conditions.

What I claim is:—

1. A staging comprising inner and outer structures relatively movable on each other, and vertically movable supports associated with each structure for respectively supporting both structures during the movement of either structure.

2. A staging comprising inner and outer structures relatively movable on each other, either transversely or longitudinally or both, and vertically movable supports associated with each structure for respectively supporting both structures during the movement of either structure.

3. A staging comprising an outer structure, a bridge movable thereon, an inner structure movable upon the bridge, the outer and inner structures being relatively movable on each other through the medium of the said bridge, and vertically movable supports associated with each structure for respectively supporting both structures during the movement of either structure.

4. A staging comprising an outer structure, a transverse bridge movable longitudinally thereon, an inner structure movable longitudinally on the bridge, the outer and inner structures being relatively movable on each other through the medium of the said bridge, and vertically movable supports associated with each structure for respectively supporting both structures during the movement of either structure.

5. A staging comprising an outer structure including spaced longitudinal track members, a tranverse bridge movable longitudinally upon the said track members, an inner structure movable longitudinally on the bridge, the outer and inner structures being relatively movable on each other through the medium of the said bridge, and vertically movable supports associated with each structure for respectively supporting both structures during the movement of either structure.

6. A staging comprising an outer structure including spaced longitudinal track members, a transverse bridge including longitudinal track members movable longitudinally upon the said track members of the outer structure, an inner structure movable longitudinally upon the said track members of the bridge, the outer and inner structures being relatively movable on each other through the medium of the said bridge, and vertically movable supports associated with each structure for respectively supporting both structures during the movement of either structure.

7. A staging comprising an outer structure including spaced longitudinal track members, a transverse bridge including longitudinal track members movable longitudinally upon the said track members of the outer structure, an inner structure movable longitudinally upon the said track members of the bridge and consisting of a substantially rectangular frame, the said frame including spaced members which are arranged parallel with the track members of the bridge, and transverse work supports connecting the said spaced members and movably engaging the said track members of the bridge, the outer and inner structures being relatively movable on each other through the medium of the said bridge, and vertically movable supports associated with each structure for respectively supporting both structures during the movement of either structure.

8. A staging comprising an outer structure including spaced longitudinal track members respectively having upper and lower track surfaces, a transverse bridge movable longitudinally thereon and including spaced longitudinal track members respectively having upper and lower track surfaces, the said bridge being provided with a plurality of pairs of spaced rollers adapted to respectively engage the said surfaces of the track members, an inner structure movable longitudinally on the track members of the bridge and provided with a plurality of pairs of spaced rollers adapted to respectively engage the said surfaces of the track members of the bridge, the outer and inner structures being relatively movable on each other through the medium of the said bridge, and vertically movable supports associated with each structure for respectively supporting both structures during the movement of either structure.

9. A staging comprising an outer structure including spaced longitudinal track members respectively having upper and lower track surfaces, a transverse bridge movable longitudinally thereon and including spaced longitudinal track members respectively having upper and lower track surfaces spaced brackets respectively depending from the end portions of the said track members of the bridge and straddling the track members of the outer structure, upper and lower rollers respectively arranged between and secured to each pair of brackets for respectively engaging the upper and lower surfaces of the track members of the outer structure, an inner structure movable longitudinally on the bridge and including spaced brackets arranged to straddle the track members of the said bridge, upper and lower rollers respectively arranged between and secured to each pair of brackets for respectively engaging the upper and lower surfaces of the track members of the bridge, the outer and inner structures being relatively movable on each other through the medium of the said bridge, and vertically movable supports associated with each structure for respectively supporting both structures during the movement of either structure.

10. A staging comprising an outer structure including spaced longitudinal track members respectively having upper and lower tracks surfaces, a plurality of vertical guides carried by the said structure for respectively receiving vertically movable spuds, a transverse bridge movable longitudinally thereon and including spaced longitudinal track members respectively having upper and lower track surfaces, spaced brackets respectively depending from the end portions of the said track members of the bridge and straddling the track members of the outer structure, upper and lower rollers respectively arranged between and secured to each pair of brackets for respectively engaging the upper and lower surfaces of the track members of the outer structure, the inner structure movable longitudinally on the bridge and including spaced brackets arranged to straddle the track members of the said bridge, upper and lower rollers respectively arranged between and secured to each pair of brackets for respectively engaging the upper and lower surfaces of the track members of the bridge, a plurality of vertical guides carried by the inner member for respectively receiving a vertically movable spud, the outer and inner structures being relatively movable on each other through the medium of the said bridge, and operating means respectively carried by the outer and inner structures for adjusting the spuds relative to the said structures, the said spuds being adapted to support both structures during the movement of either structure.

11. A staging comprising a plurality of supports, an outer structure vertically movable thereon, and an inner structure movably mounted on the outer structure.

12. A staging comprising a plurality of supports, an outer structure vertically movable thereon, a bridge movable on the outer structure, and an inner structure movably mounted on the said bridge.

13. A staging comprising a plurality of supports, an outer structure vertically mounted thereon, a transverse bridge movable longitudinally on the said structure, and an inner structure movable longitudinally on the bridge.

14. A staging comprising a plurality of supports, an outer structure vertically movable thereon and including spaced longitudinal track members, a transverse bridge including longitudinal track members movable longitudinally on the said track members of the outer structure, and an inner structure movable longitudinally upon the said track members of the bridge.

15. A staging comprising a plurality of supports, an outer structure including spaced longitudinal track members, a transverse bridge including longitudinal track members movable longitudinally upon the said track members of the outer structure, and an inner structure movable longitudinally upon the said track members of the bridge, the said inner structure consisting of a substantially rectangular frame including spaced members which are arranged parallel with the track members of the bridge, and transverse work supports connecting the said spaced members which movably engage the said track members of the bridge.

16. A staging comprising a plurality of supports, an outer structure vertically movable thereon and including spaced longitudinal track members respectively having upper and lower track surfaces, a transverse bridge movable longitudinally thereon and including spaced longitudinal track members respectively having upper and lower track surfaces, the said bridge being provided with a plurality of pairs of spaced rollers adapted to respectively engage the said surfaces of the track members of the outer structure, and an inner structure movable longitudinally on the track members of the bridge and provided with a plurality of pairs of spaced rollers adapted to respectively engage the said surfaces of the track members of the bridge.

17. A staging comprising a plurality of supports, an outer structure vertically movable thereon and including spaced longitudinal track members respectively having upper and lower track surfaces, a transverse bridge movable longitudinally thereon and including spaced longitudinal track members respectively having upper and lower track surfaces, spaced brackets respectively depending from the end portions of the said track members of the bridge and straddling the track members of the outer structure, upper and lower rollers respectively arranged between and secured to each pair of brackets for respectively engaging the upper and lower surfaces of the track members of the outer structure, and an inner structure movable longitudinally on the bridge and including spaced brackets arranged to straddle the track members of the said bridge, upper and lower rollers respectively arranged between and secured to each pair of brackets for respectively engaging the upper and lower surfaces of the track members of the bridge.

18. A staging comprising a plurality of supports, an outer structure vertically movable thereon and including spaced longitudinal track members respectively having upper and lower track surfaces, a transverse bridge movable longitudinally thereon and including spaced longitudinal track members respectively having upper and lower track surfaces, spaced brackets respectively depending from the end portions of the said track members of the bridge and straddling the track members of the outer structure, upper and lower rollers respectively arranged between and secured to each pair of brackets for respectively engaging the upper and lower surfaces of the track members of the outer structure, an inner structure movable longitudinally on the bridge and including spaced brackets arranged to straddle the track members of the said bridge, upper and lower rollers respectively arranged between and secured to each pair of brackets for respectively engaging the upper and lower surfaces of the track members of the bridge, a plurality of vertical guides carried by the outer structure for respectively receiving a vertically movable support, and operating means carried by the said outer structure and engaging the supports for adjusting the said outer structure with respect to the same.

19. The combination with a plurality of supports, of an outer structure vertically movable thereon, an inner structure movable on the outer structure, and means carried by the outer structure and engaging the supports for adjusting the outer structure relative to the said supports.

20. The combination with a plurality of supports, of an outer structure vertically movable thereon, a bridge movable on the outer structure, an inner structure movably mounted on the bridge, and means carried by the outer structure and engaging the supports for adjusting the outer structure relative to the said supports.

21. A staging or support for submarine boring, blasting, pile-driving, etc., comprising two structures, means for connecting said structures so as to permit their relative movement on each other, vertically movable supports for said structures which normally rest upon the sea or other bottom, one of the structures carrying the tools or working apparatus, both structures being adapted to be moved separately and bodily for the purpose set forth.

In testimony, that I claim the foregoing as my invention, I have signed my name in presence of two subscribing witnesses.

ROBERT ALWYN ARNOLD STEPHEN PIERCY.

Witnesses:
CHRISTOPHER NOBLE PULMAN,
JOHN GASKIN.